(12) United States Patent
Gnesda et al.

(10) Patent No.: US 6,721,554 B2
(45) Date of Patent: Apr. 13, 2004

(54) METHOD AND APPARATUS FOR POLICY-BASED CHARGING FOR TELECOMMUNICATIONS SERVICES

(75) Inventors: Nicholas J. Gnesda, Aurora, IL (US); Kenneth Frank Smolik, Naperville, IL (US); Jeffrey Arthur Zahnle, Elburn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 514 days.

(21) Appl. No.: 09/733,460

(22) Filed: Dec. 8, 2000

(65) Prior Publication Data

US 2002/0072333 A1 Jun. 13, 2002

(51) Int. Cl.[7] .............................................. H04M 11/00
(52) U.S. Cl. .................. 455/406; 455/408; 379/114.05; 379/114.06
(58) Field of Search .............................. 455/67.11, 405, 455/406, 408, 423–424; 370/229, 230, 232; 379/114.01, 114.05, 114.06

(56) References Cited

U.S. PATENT DOCUMENTS 6,363,053 B1 * 3/2002 Schuster et al. ............ 370/230

FOREIGN PATENT DOCUMENTS

| EP | 0714195 A1 | 11/1995 | |
|---|---|---|---|
| EP | 0714195 | 5/1996 | .......... H04M/15/00 |
| GB | 2311439 | 9/1997 | .......... H04L/12/56 |
| WO | WO 9524093 | 9/1995 | .......... H04M/15/00 |
| WO | WO 95/24093 | 9/1995 | |
| WO | WO 01/28219 A2 | 4/2001 | |
| WO | WO0128219 | 4/2001 | .......... H04M/15/00 |

OTHER PUBLICATIONS

Bernabei et al: A Policy Based Architecture for Guaranteed QOS Multimedia Services; IEEE Conf 2000 on High Performance Switching & Routing Jun. 26–29, 2000.
Bernabei F., et al, "A Policy Based Architecture For Guaranteed QOS Multimedia Services"; proceedings of the IEEE Conference 2000 on High Performance Switching and Routing; Heidelberg, Germany; Jun. 26–29, 2000; Proceedings of the IEEE Conference on High Performance Switching and Routing, New York, NY, Jun. 26, 2000; pp. 401–409.

* cited by examiner

Primary Examiner—Lee Nguyen

(57) ABSTRACT

The present invention bills a call in accordance with a measured quality of service (QoS) level afforded by the call and specified in a service level agreement. The measured quality of service is determined from a collection of measurements associated with the call. An adjustment factor is determined by a subscriber class of service and the measured quality of service. The adjustment factor is utilized by a billing processor in rating the call.

19 Claims, 18 Drawing Sheets

| measured QoS level 701' | defined QoS levels: Service Level Agreement (SLA) | | | | | |
|---|---|---|---|---|---|---|
| | AFER(A1) 702 | PFER(A2) 703 | AFER(A3) 704 | delay 705 | average data throughput 706 | allowable dropped 707 call area |
| L3 — 708 | .lt.1% — 711 | .lt.1% — 712 | .lt.2% — 713 | .lt.80 msec — 714 | .gt.28800 bps — 715 | A3 — 716 |
| L2 — 709 | .lt.1% — 717 | .lt.2% — 718 | .lt.2% — 719 | .lt.100 msec — 720 | .gt.19000 bps — 721 | A3 — 722 |
| L1 — 710 | .lt.2% — 723 | .lt.2% — 724 | NS — 725 | .lt.100 msec — 726 | .gt.14400 bps — 727 | A2,A3 — 728 |
| L0 — 730 | one or more requirements for L1 not satisfied | | | | | |

FIG. 8

| class of service — 800<br>measured QoS level — 701 | SLA – adjustment factor ||| 
|---|---|---|---|
| | Class 1 (peak hours) — 801 | Class 1 (off-peak hours) — 802 | Class 2 — 803 |
| L3 — 708 | 1.0 — 805 | 0.8 — 806 | 1.0 — 807 |
| L2 — 709 | 0.6 — 808 | 0.4 — 809 | 1.0 — 810 |
| L1 — 710 | 0.4 — 811 | 0 — 812 | 0.6 — 813 |
| L0 — 730 | 0 — 814 | 0 — 815 | 0 — 816 |

FIG. 15

Measurement Ranges for SLA

| AFER(A1) 702 | | PFER(A2) 703 | | AFER(A3) 704 | | delay(A3) 705 | | average data throughput 706 | | Dropped call location 707 | |
|---|---|---|---|---|---|---|---|---|---|---|---|
| .lt.1% 1501 | 00 1502 | .lt.1% 1507 | 00 1508 | .lt.2% 1513 | 0 1514 | .lt. 80 msec 1517 | 00 1518 | .gt. 28800 bps 1523 | 00 1524 | A3 1531 | 11 1532 |
| .lt.2% 1503 | 01 1504 | .lt.2% 1509 | 01 1510 | .gt.2% 1515 | 1 1516 | .lt. 100 msec 1519 | 01 1520 | .gt. 19000 bps 1525 | 01 1526 | A2 1533 | 10 1534 |
| .gt.2% 1505 | 10 1506 | .gt.2% 1511 | 10 1512 | | | .gt. 100 msec 1521 | 10 1522 | .gt. 14400 bps 1527 | 10 1528 | A1 1535 | 01 1536 |
| | | | | | | | | .lt. 14400 bps 1529 | 11 1530 | None 1537 | 00 1538 |

FIG. 16

| Measurement Ranges Corresponding to Defined QoS levels according to SLA | | | | | | |
|---|---|---|---|---|---|---|
| measured 701 QoS level | AFER(A1) 702 | PFER(A2) 703 | AFER(A3) 704 | delay 705 | average data throughput 606 | Dropped call location 607 |
| L3 — 708 | 00 — 1502 | 00 — 1508 | 0 — 1514 | 00 — 1518 | 00 — 1524 | 11 00 — 1602 |
| L2 — 709 | 00 — 1502 | 01 — 1510 | 0 — 1514 | 01 — 1520 | 01 — 1526 | 11 00 — 1603 |
| L1 — 710 | 01 — 1504 | 01 — 1510 | 0 1 — 1601 | 01 — 1520 | 10 — 1528 | 11 10 00 — 1604 |

FIG. 17

| Digitization of defined QoS levels | |
|---|---|
| measured QoS level — 701 | Concatenated measurement ranges |
| L3 — 708 | 0,3 — 1702 |
| L2 — 709 | 148,151 — 1703 |
| L1 — 710 | 664,666,667,728,730,731 — 1704 |

METHOD AND APPARATUS FOR POLICY-BASED CHARGING FOR TELECOMMUNICATIONS SERVICES

FIELD OF THE INVENTION

The present invention provides for charging or billing telecommunications services in accordance with a level of service agreement.

BACKGROUND OF THE INVENTION

Throughout the 1980's and 1990's, the types of telecommunications services and the means for transmitting the associated information content for the user have diversified. Examples of telecommunications services include voice, data, and multimedia services. A call path from a telecommunications user to another user can utilize either digital or analog transmission schemes with copper wire facilities, microwave radio facilities, cellular/PCS radio facilities, fiber cable facilities, or a combination of any of the above transmission media. The call path can utilize a plurality of call segments, each call segment being associated with a transmission medium. Moreover, the transmission configuration of the call path can be dynamic over a duration of the call. As an example, a wireless call establishes a radio connection from a mobile telephone to the "closest" base station. As the mobile telephone traverses the service area, the radio connection is re-established to another base station that is "closest" to the mobile. This trend of increased service and transmission diversity will increase in the 2000's and beyond.

The corresponding benefit to the telecommunications user is great; however, from a marketing aspect, a service provider needs to charge the telecommunications user at a rate that is related to a degree of benefit to the user. Both the type of service (e.g. voice, slow-speed data, high-speed data, and video) and a quality of service (QoS) are factors that may be considered in the determination of the cost of the call. The prior art of billing telecommunications services does not provide the flexibility of adjusting the cost with respect to the quality of service of a call. In the prior art, typical billing procedures for data services is to adjust the associated bill according to the down-time of the assigned facility. The adjustment is specified in a service level agreement (SLA). Another billing approach of the prior art is to reduce the bill for calls that failed or "dropped." The adjustment can utilize call detail records (CDR's) to determine calls that failed and to reduce the bill by the cost of the failed calls. Alternatively, the telecommunications user can notify the service provider of the calls having an "unacceptable" quality of service. The service provider can consequently adjust the bill according to billing policies.

SUMMARY OF THE INVENTION

The present invention provides methods, apparatus, and articles of manufacture for billing a call in accordance with a measured quality of service (QoS) level afforded by the call. An adjustment of rating the call (for purposes of billing the call) is specified in a service level agreement (SLA) that specifies the adjustment in relation to a set of factors comprising the measured QoS level and a class of service that is assigned to a subscriber. The present invention utilizes the methods, the apparatus, and articles of manufacture to calculate the measured QoS level during the call according to a collection of measurements associated with the call. Comparing the measured QoS level with a defined QoS level that is specified in the SLA, an adjustment factor of the call is determined. A billing processor utilizes the adjustment factor for rating the call. Also, the present invention optionally delivers call detail records and the collection of measurements to the subscriber or to a third party for evaluation in order to verify billing by a service provider.

The disclosure of the invention includes several variations of an exemplary embodiment. One variation of the exemplary embodiment compares each measurement of the collection of measurements with a target objective. If all measurements are consistent with the target objective, the measured QoS level is equated to the corresponding QoS level. A second variation of the exemplary embodiment utilizes a data structure comprising a grading database and an adjusting database. A number that represents the collection of measurements is used to determine the measured QoS level from the grading database. The measured QoS level identifies a data entry of the adjusting database, providing an adjustment factor for rating the call by the billing processor. The present invention offers a flexible approach for billing a wide spectrum of telecommunications services according to the type of service and an actual quality of service that is provided to the subscriber on a call basis. In other words, the subscriber "pays for what he/she gets."

BRIEF DESCRIPTION OF THE DRAWINGS

FIG. 7 is a table representing a record of a service level agreement according to the present invention;

FIG. 8 is a second table delineating adjustment factors in accordance to the service level agreement of FIG. 7;

FIG. 15 is a table of measurement ranges according to the service level agreement of FIG. 7;

FIG. 16 illustrates measurement ranges for defined QoS levels according to the service level agreement of FIG. 7;

FIG. 17 shows the digitization of defined QoS levels contained in the entries of the grading database shown of FIG. 13.

DETAILED DESCRIPTION

Figure 1:
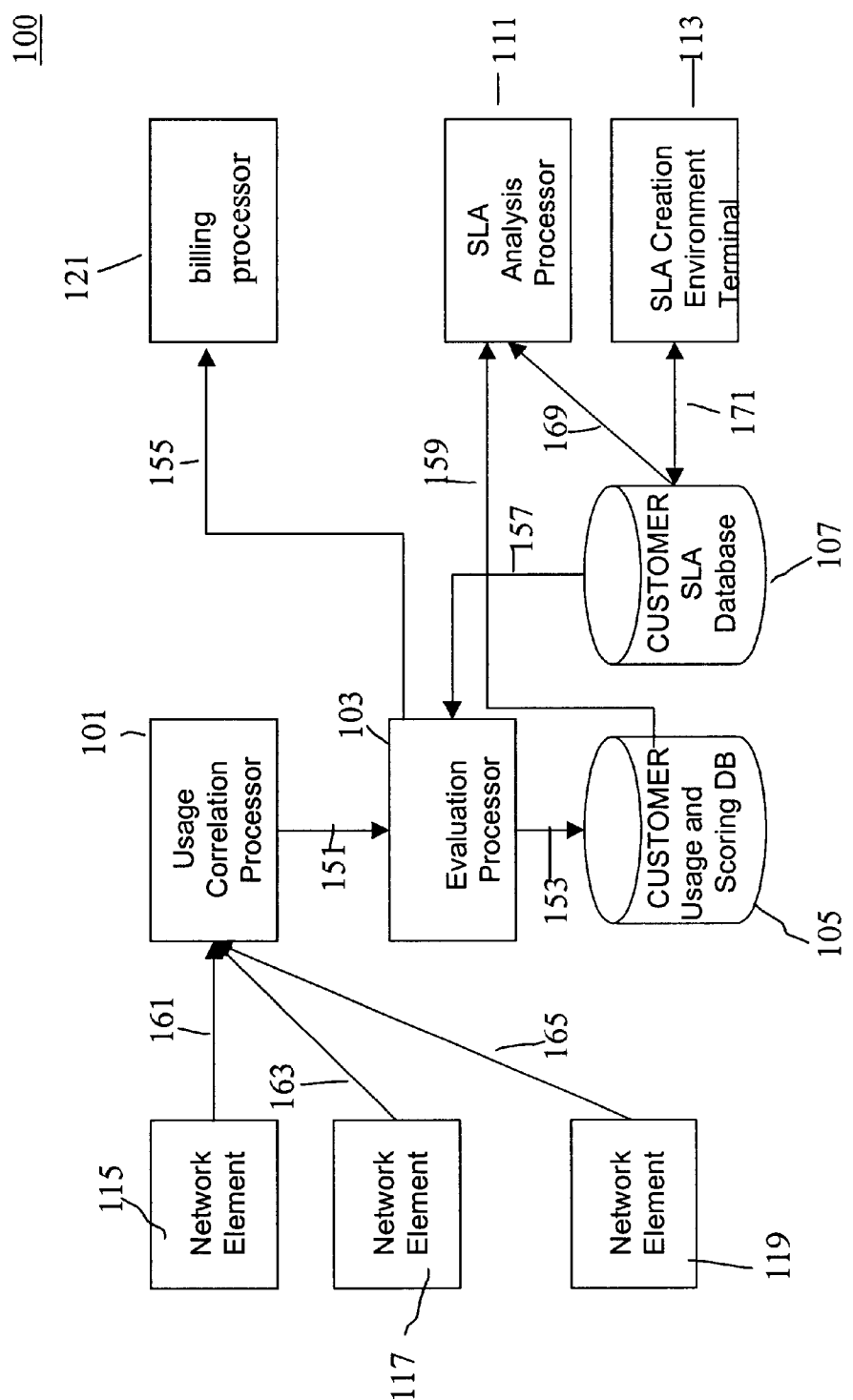
FIG. 1 shows apparatus according to the present invention.

FIG. 1a shows telecommunications system employing an exemplary embodiment according to the present invention. Usage correlation processor 101 collects measurements that reflect the usage information and measurements that reflect a quality of service for a call from network elements 115, 117, and 119 through interfaces 161, 163, and 165. Network elements 115, 117, and 119 are components that comprise a telecommunications network. Examples of network elements are mobile switching centers (MSC's), base stations, ATM switches, gateway switches, and routers, as are known in the art. The data collected by usage correlation processor 101 is passed to evaluation processor 103 through interface 151 for further processing. Usage correlation processor 101 forms a call detail record (CDR) for the call, and evaluation processor 103 evaluates the measurements collected by usage correlation processor 101 in the context of a service level agreement (SLA). The SLA is an agreement between a subscriber and a service provider with respect to the quality of service (QoS). Conditions of the SLA are explained further, below, in connection with FIG. 7 and FIG. 8. The conditions of the SLA are stored in customer SLA database 107 and are passed to evaluation processor 103 through interface 157.

Evaluation processor 103 "scores" the call according to the SLA. Evaluation processor 103 obtains SLA information about the subscriber from subscriber SLA database 107 through interface 157. "Scoring" is defined as the evaluation of the quality of the call in relation to the measured QoS level that is specified in the SLA.

Evaluation processor 103 sends usage information and scoring information of the call to customer usage and scoring database 105 through interface 153. The subscriber or a third party can view call detail data and the associated measured quality of service through an external processor such as SLA analysis processor 111. SLA analysis processor 111 processes information from customer usage and scoring database 105 through interface 159 and from customer SLA database 107 through interface 169.

The service provider can construct the SLA for the subscriber by entering data into SLA creation environment terminal 113. Terminal 113 enables the service provider to enter information into customer SLA database 107 through interface 171 in order to construct the SLA for the subscriber. Different SLA's can be constructed for different subscribers according to the business practices followed by the service provider.

Evaluation processor 103 sends CDR's and QoS information to billing processor 121 through interface 155. Billing processor 121 uses the QoS information for generating the bill to the subscriber for telecommunications services. The associated rating of the call is discussed in FIG. 8.

Usage correlation processor 101, evaluation processor 103, SLA analysis processor 111, SLA creation environment terminal 113, customer usage and scoring database 105, and customer SLA database 107 can reside on the same or on different computer platforms although elements 101, 103, 111, 113, 105, and 107 are logically distinct.

Figure 2:
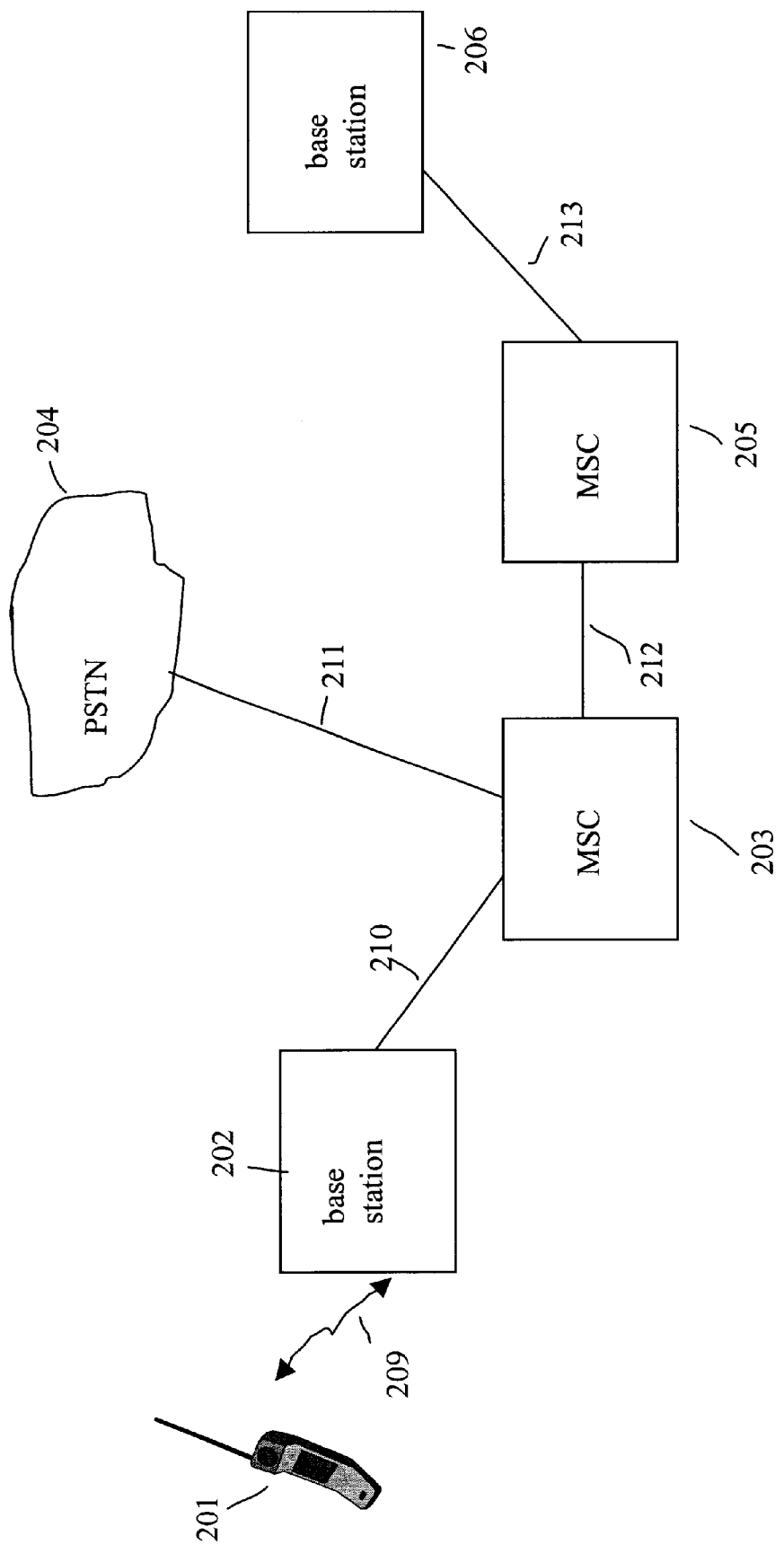
FIG. 2 illustrates a telecommunications system supported by the present invention.

FIG. 2 illustrates a telecommunications system that is supported by the present invention. Mobile telephone 201 is served by base station 202 through radio link 209. A call involving mobile telephone 201 is connected to public telephone switching network (PSTN) 204 through mobile switching center (MSC) 203 via facility 210 and facility 211. In FIG. 2 the configured call path of the call at the corresponding time is through radio link 209, base station 202, facility 210, MSC 203, facility 211, and PSTN 204. Network elements, as exemplified by network elements 115, 117, and 119 in FIG. 1, comprise base station 202, MSC 203, PSTN 204, MSC 205, and base station 206.

Figure 3:
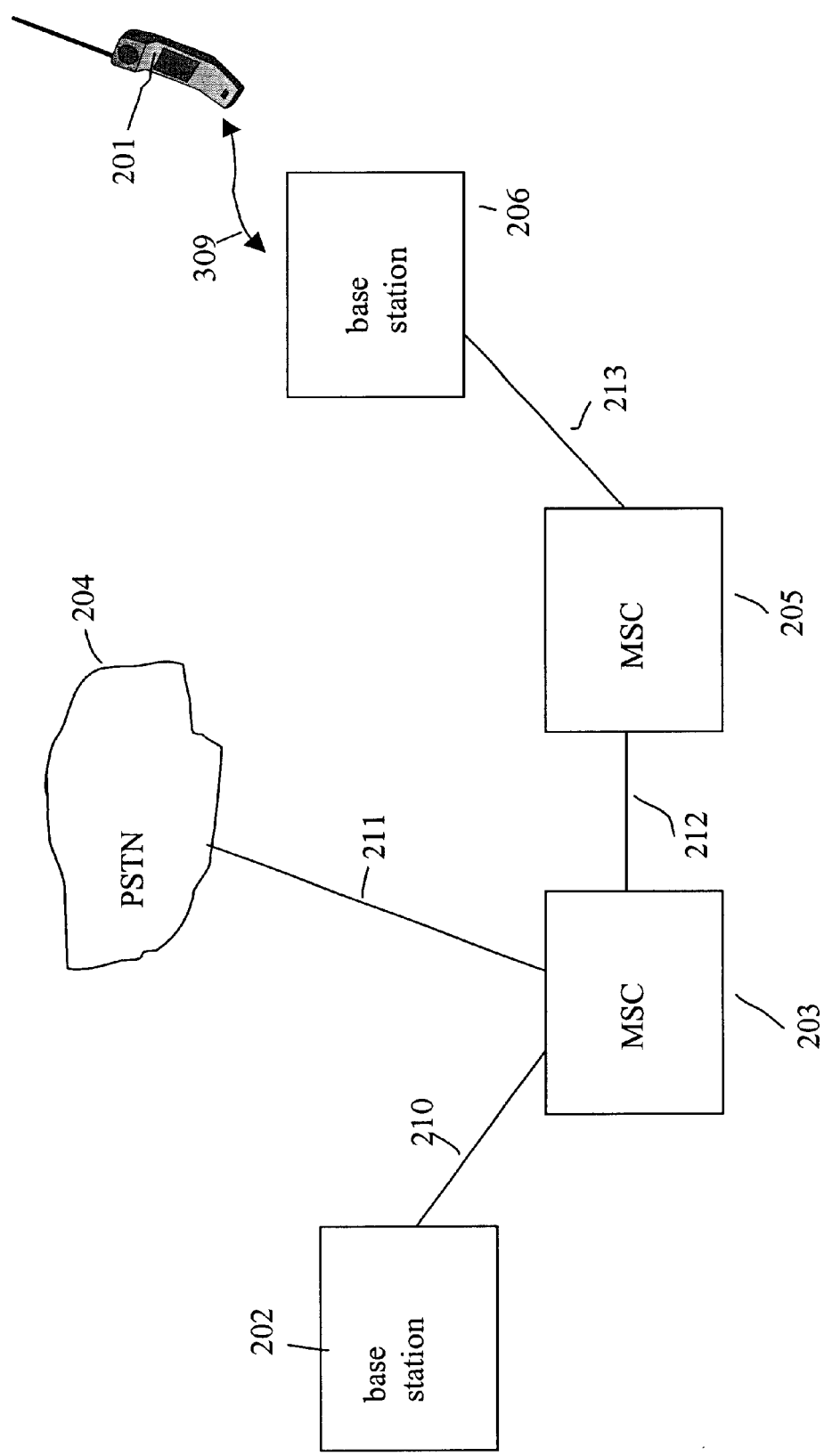
FIG. 3 shows an alteration of a call path for a mobile being served by the telecommunications system that is illustrated in FIG. 2.

In FIG. 3 mobile telephone 201 has moved from the previous position corresponding to FIG. 2 and is served by base station 206 through radio link 309. The call path of the call at the corresponding time is through radio link 309, base station 206, facility 213, MSC 205, facility 212, MSC 203, facility 211, and PSTN 204. In FIG. 2 and FIG. 3, each of the corresponding call paths is termed as a "call segment." A "call segment" is a subset of a call path and may be the call path itself.

Figure 4:
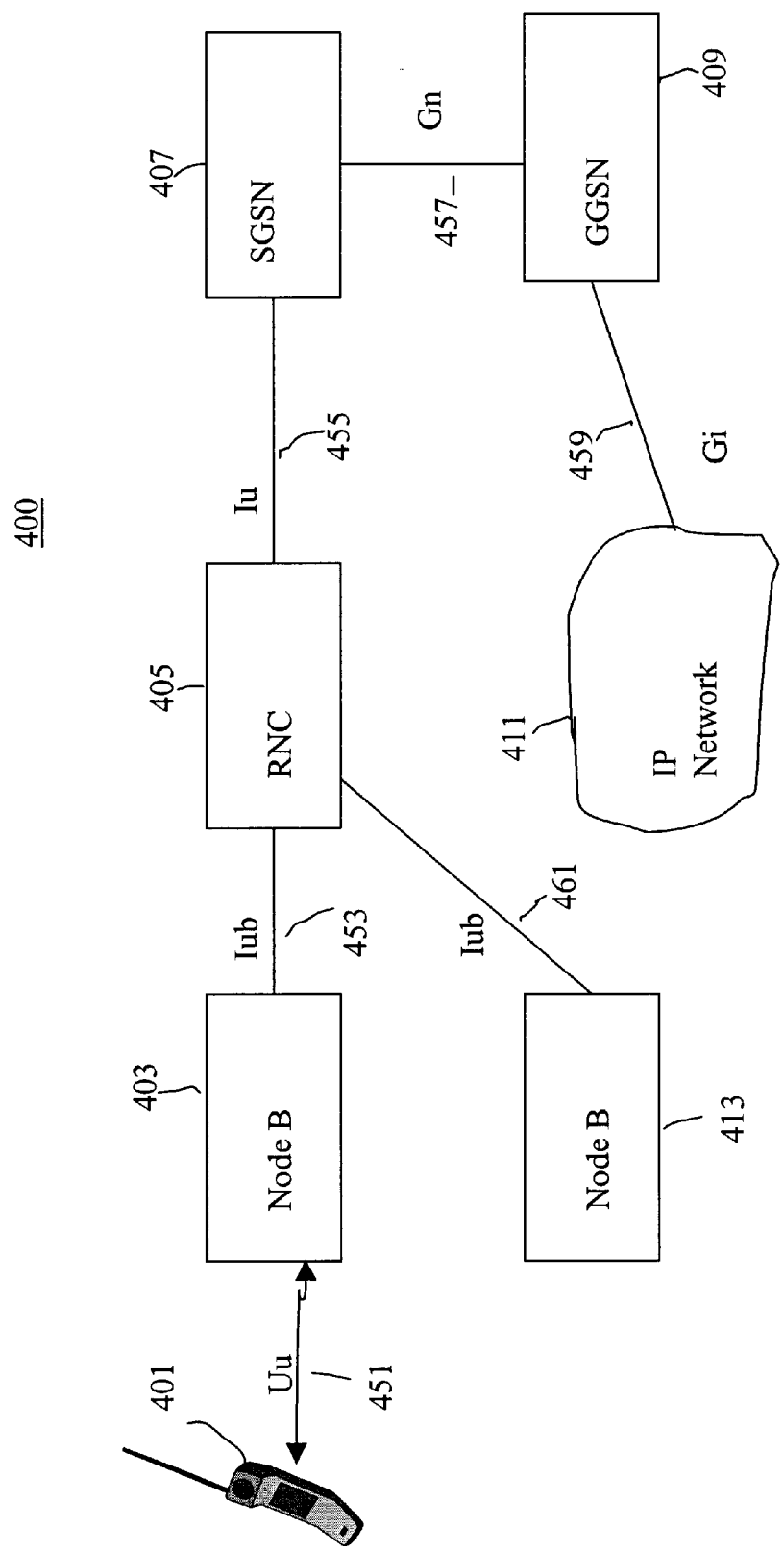
FIG. 4 illustrates a UMTS system supported by the present invention.

FIG. 4 illustrates universal mobile telecommunications system (UMTS) 400 for providing packet switched services as supported by the present invention. Mobile telephone 401 is served by Node B 403 (having an analogous function as base station 202 in FIG. 2 and FIG. 3). A call path is established from mobile telephone 401, over Uu radio link 451, Node B 403, Iub interface 453, radio network controller (RNC) 405, Iu interface 455, serving GPRS node (SGSN) 407, Gn interface 457, gateway GPRS support node (GGSN) 409, Gi interface 459, to IP network 411. Node B 403, RNC 405, SGSN 407, and GGSN 409 are network elements that correspond to network elements 115, 117, and 119 in FIG. 1.

As previously defined, a "call segment" is a subset of the call path. In FIG. 4, a first call segment corresponds to the call path itself. Additionally, a second call segment spans mobile telephone 401, radio link Uu 451, Node B 403, interface Iub 453, and RNC 405. A third call segment spans RNC 405, Iu interface 455, and SGSN 407. Measurements associated with any of the call segments can be collected by apparatus 100 from any of the network elements (e.g. Node B 403, RNC 405, SGSN 407, and GGSN 409) in order to determine the measured QoS level.

As with the telecommunications system shown in FIG. 2 and FIG. 3, mobile telephone 401 can change location so that Node B 413 (connected to RNC 405 through Iub interface 461) subsequently serves the call. In such a case, the call path changes, thus causing apparatus 100 to collect measurements for the corresponding call segments from the associated network elements (e.g. Node B 413). Moreover, movement of mobile telephone 401 can cause the serving RNC and the serving SGSN to change, causing a subsequent alteration of the call path.

As can be appreciated by one skilled in the art, apparatus 100 is applicable to telecommunications systems in which measurements are collected for a call and subsequently utilized to determine a quality of service for the call. Applicable telecommunications systems include wireless communications systems, terrestrial communications systems, e.g. Internet protocol (IP) networks, and satellite-based communications systems.

Figure 5:
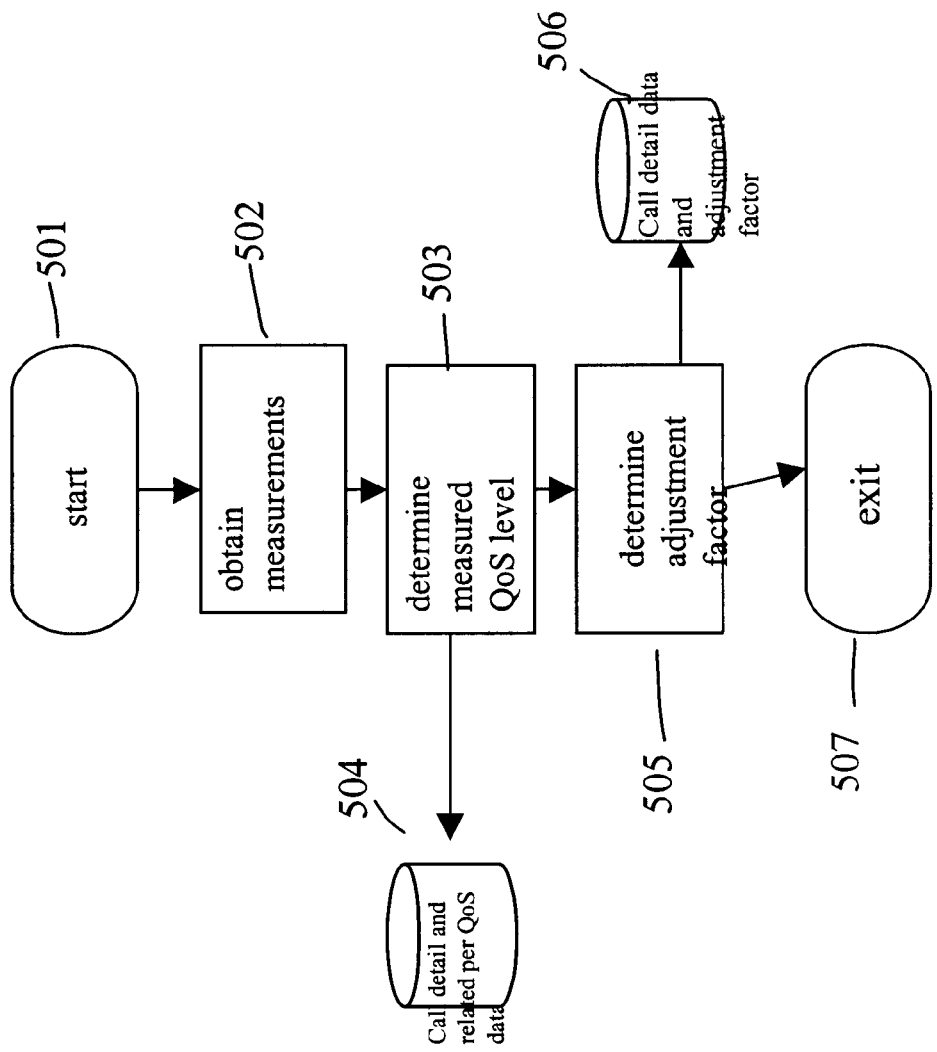
FIG. 5 is a flow diagram for policy-based charging in accordance with the present invention.

FIG. 5 is a flow diagram for policy-based charging (in accordance to the SLA) as processed by apparatus 100. Step 501 initiates the process in order to determine the measured QoS level of the call. In step 502, usage correlation processor 101 obtains measurements associated with the call from network elements (e.g. MSC 203 and MSC 205 in FIG. 2 and FIG. 3) and determines a call detail record. In step 503, evaluation processor 103 utilizes measurement information and usage information as collected in step 502 to evaluate the measured QoS level of the call. The call detail record and QoS data is sent to storage device 504 (corresponding to customer usage and scoring database 105 in FIG. 1) for the subscriber's evaluation. The QoS information from step 503 is processed in step 505 so that an adjustment factor can be determined in accordance with the SLA. The call detail information and adjustment factor is passed to storage device 506 (which corresponds to billing processor 121 in FIG. 1) for policy-based charging the call in accordance with the SLA. In other variations of the exemplary embodiment, a plurality of adjustment factors (e.g. a distinct adjustment factor for different call paths in FIG. 2 and FIG. 3) may be presented to storage device 506 for charging by billing processor 121.

Figure 6:
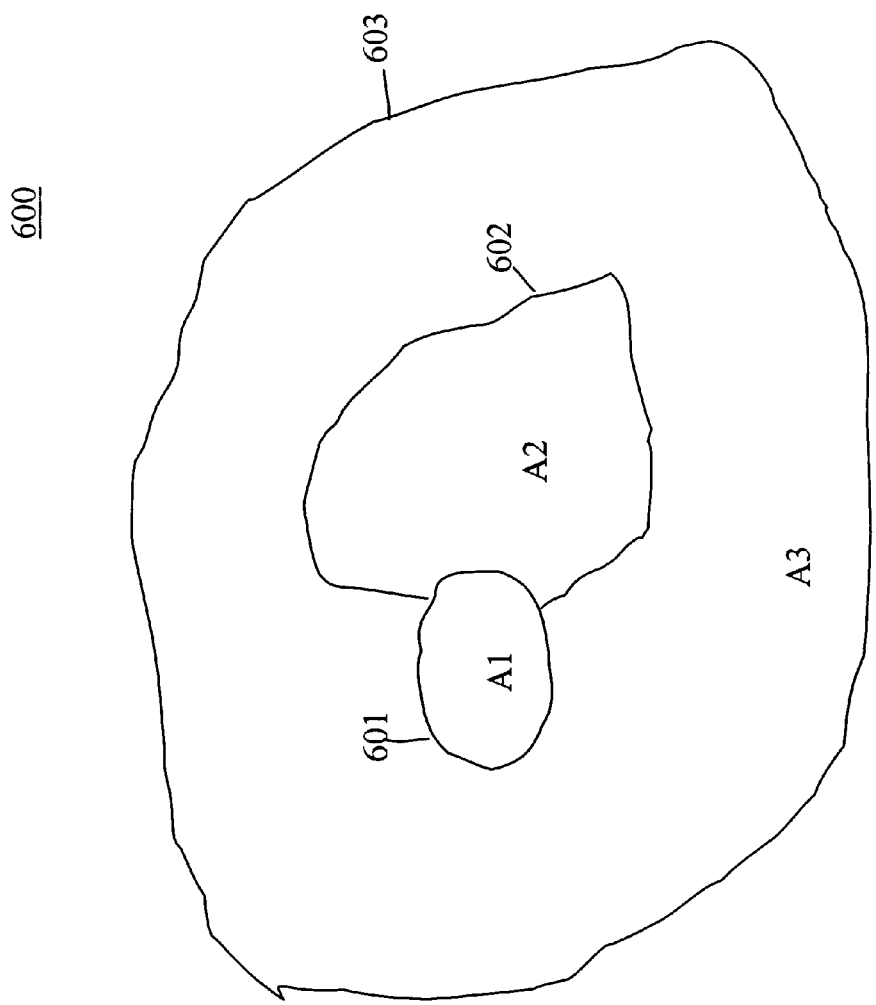
FIG. 6 illustrates the partitioning of a region being served by a telecommunications system.

The SLA specifies service region 600 in which telecommunications services are for the subscriber as shown FIG. 6. The service region 600 is partitioned into area 601 (A1), area 602 (A2), and area 603 (A3). The SLA can specify the measured QoS level in which the call will not drop (fail) in specified areas. As an example, the SLA can specify that the call will not drop in area 601 (A1) without any similar stipulation for area 602 (A2) and area 603 (A3). If the call drops, the charging of the call is adjusted according to the SLA. With the same example, if the call drops in area 602 or area 603, no charging adjustment is necessary according to the SLA.

FIG. 7 is a table representing an example of service level agreement (SLA) 700 according to the present invention. Measured QoS level 701 is classified into four defined QoS levels: defined QoS level L3 708, defined QoS level L2 709, defined QoS level L1 710, and defined QoS level L0 730. Evaluation processor 103 processes the measurements obtained during the call in order to determine measured QoS level 701.

With SLA 700, six measurements are processed to determine measured QoS level 701: AFER (A1) 702 which is the average frame error rate in area 601, PFER (A2) 703 which is the peak frame error rate in area 602, AFER (A3) 704 which the average frame error rate in area 603, delay 705 which is the one-way time delay experienced by the call, average data throughput 706 is the average data throughput supported by the call, and allowable dropped call area 707. SLA 700 can further specify measurements associated with different call segments if a plurality of call segments are configured during the call. (An example of this is shown in FIG. 2 and FIG. 3 in which different call segments are configured during different times during the call).

Each defined QoS level (L3 708, L2 709, L1 710, and L0 730) corresponds to different measurement ranges. With SLA 700, L3 provides the "best" QoS to the subscriber. L3 708 specifies that AFER (A1) 702 has an average frame error rate less than (.lt.) 1% as specified in entry 711, PFER (A2) 703 has a peak frame error rate less than 1% as specified in entry 712, AFER (A3) 704 has an average frame error rate less than 2% as specified in entry 713, delay 705 has a call delay less than 80 msec as specified in entry 714, average data throughput is at least (.gt.) 28,800 bps as specified in entry 715, and allowable dropped call area 707 consisting of area 603 (A3) as specified by entry 716. Entry 716 specifies that if the call drops in either area 601 (A1) or area 602 (A2), the charging of the call is adjusted. Similarly, L2 709 is specified by entries 717, 718, 719, 720, 721, and 722. L1 710 is specified by entries 723, 724, 725, 726, 727, and 728. Entry 725 is equal to "NS" (not specified). According to SLA 700, AFER (A3) 704 is not a requirement in the determination of L1 710. If measured QoS level 701 does not satisfy at least one requirement specified for L1 710, then measured QoS level 701 is equal to defined QoS level L0 730.

FIG. 8 is a second table delineating adjustment factors that are associated with SLA 700. (As shown in FIG. 1, evaluation processor 103 sends an adjustment factor to billing processor 112 for charging the call.) The subscriber is associated with class_1 (peak hours) 801, class_1 (off-peak hours) 802, or class_2 803. The subscriber can be assigned different classes of service dependent upon the time and the day as exemplified by class_1 (peak hours) 801 and class_1 (off-peak hours) 802 corresponding to peak hours and off-peak hours, respectively.

One skilled in the art appreciates the diversity of other classes of service that are applicable to telecommunications services. One example is supported by UMTS 400 in which four classes of service are defined: conversational, streaming, interactive, and background. The class of service that is determined by UMTS 400 for a call is based upon the real-time requirements of a service, e.g. e-mail or multimedia services.

In FIG. 8 an adjustment factor is determined by measured QoS level 701 and class of service 800 that is assigned to the subscriber. With SLA 700, if class of service 800 is equal to class_1 (peak hours) 801, the adjustment factor is equal to 1.0 as specified in entry 805 for L3 708, the adjustment factor is equal to 0.6 as specified in entry 808 for L2 709, the adjustment factor is equal to 0.4 for L1 710 as specified in entry 811, and the adjustment factor is equal to 0 for L0 804 as specified in entry 814. Similarly, entries 806, 809, 812, and 815 correspond to class_1 (off-peak hours) 802, and entries 807, 810, 813, and 816 correspond to class_2 803.

In FIG. 8 according to SLA 700, a minimally acceptable minimum QoS level is specified for which the subscriber is charged at a "normal" rate (as specified by the adjustment factor equal to 1.0). As an example, the minimally acceptable QoS level is equal to L2 709 if class_2 803 is assigned to the subscriber. If measured QoS level 701 is actually "better" than the minimally acceptable QoS level that is specified by SLA 700, the subscriber is charged at the rate corresponding to the minimally acceptable QoS level. In the example with class_2 803, adjustment factors 807 and 810 are equal to 1.0 whether measured QoS level 701 is equal to L3 708 or L2 709. On the other hand, if measured QoS level 701 is "worse" than the minimally acceptable minimum QoS level, as specified in SLA 700, the subscriber is charged at an adjusted rate. With the example, if the measured QoS level 701 is equal to L1 710, the subscriber is charged at an adjusted rate with respect to the charges associated with L2 709.

The adjustment factor as determined by measured QoS level 701 and class of service 800 is stored in storage device 506 (as shown in FIG. 5) and is subsequently processed by billing processor 121 (as shown in FIG. 1). As an example of a utilization of the adjustment factor, billing processor 121 can multiply the "normal" charging rate by the adjustment factor (e.g. adjustment factor 805, 808, 811, and 814) in order to modify the charging rate in accordance with SLA 700. (The act of determining the charging rate is known as "rating" in the art.) Alternatively, billing processor 121 can utilize the adjustment factor as a pointer to a database referenced by billing process 121 in order to determine the modified charging rate. Other alternative examples of rating a call can be appreciated by one skilled in the art.

Figure 9:
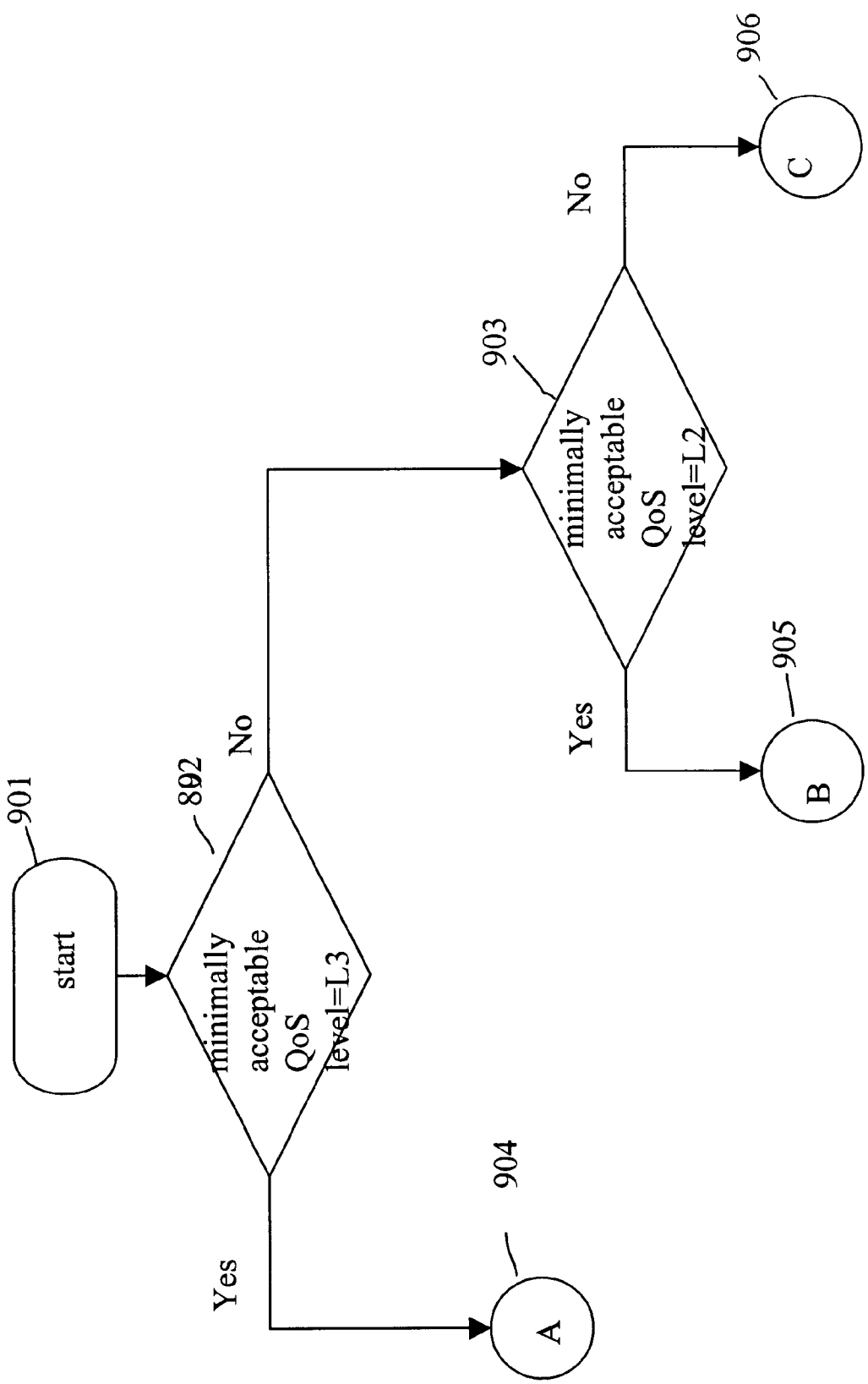
FIG. 9 is a flow diagram in which a minimally acceptable quality of service level is determined according to the service level agreement of FIG. 7.

FIG. 9 is a flow diagram in which measured QoS level 701 is determined according to SLA 700 referenced in FIG. 7. Step 901 initiates the process. In step 902, customer SLA database 107 is accessed in order to determine the minimally acceptable QoS level specified for the subscriber in SLA 700. If the minimally acceptable QoS level is equal to L3 708, step 904 is executed and subsequently evaluation processor 103 follows the flow diagram in FIG. 10. Otherwise, step 903 is executed. If the minimally acceptable QoS level is equal to L2 709, step 905 is executed, and subsequently evaluation processor 103 follows the flow diagram in FIG. 11. Otherwise, step 906 is executed, and subsequently evaluation processor 103 follows the flow diagram in FIG. 12.

Figure 10:
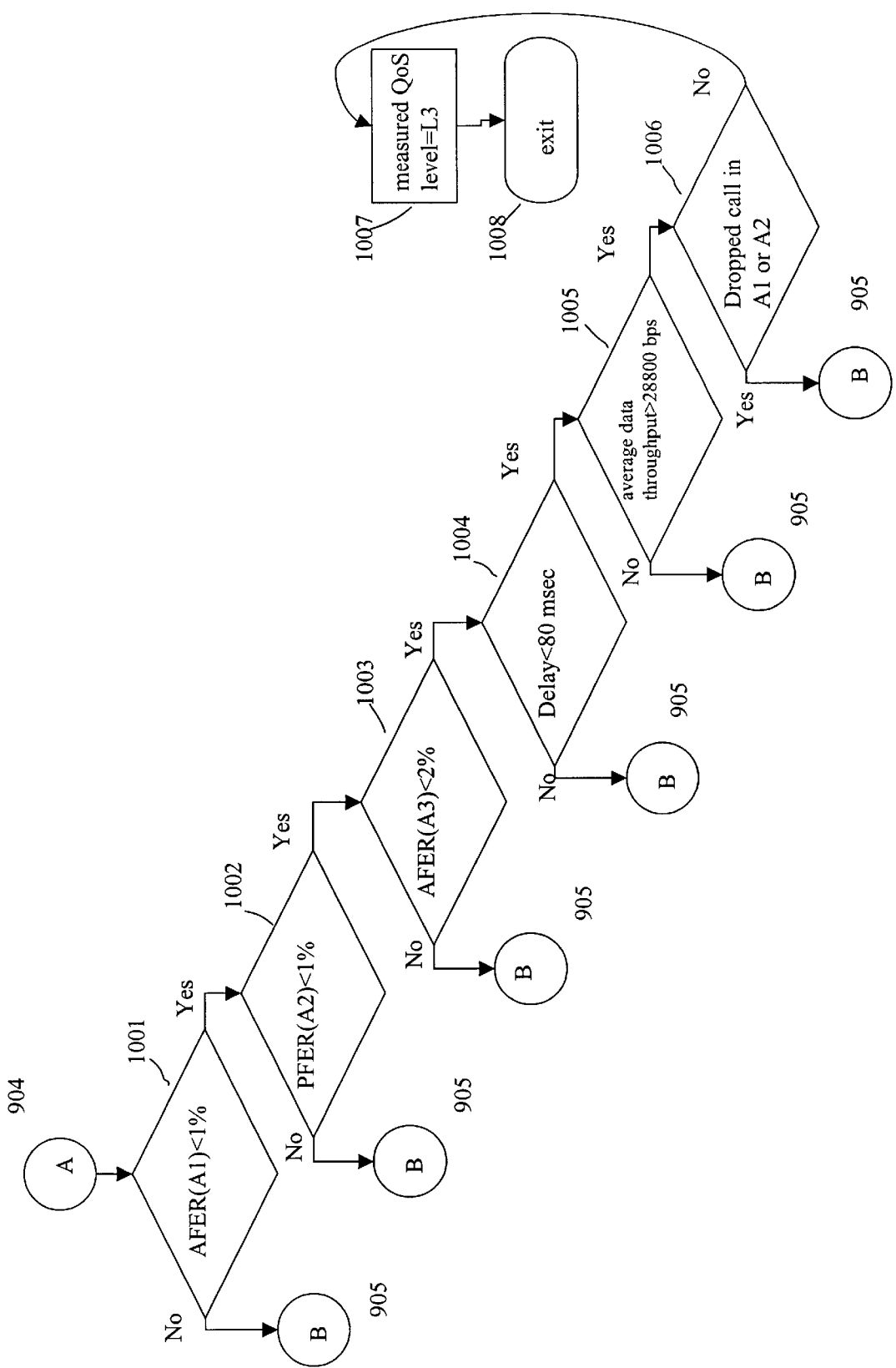
FIG. 10 is a flow diagram to determine whether a measured quality of service level of a call is equal to a third defined quality of service level according to the service level agreement of FIG. 7.

FIG. 10 is a flow diagram to determine whether measured QoS level 701 of the call is equal to L3 708. The flow diagram verifies that the measurements associated with the call satisfy the requirements specified in SLA 700 for L3 708 as shown in FIG. 7. Step 1001 verifies that AFER (A1) is less than 1% corresponding to entry 711 in FIG. 7. If not, step 905 is executed, and subsequently evaluation processor 103 follows the flow diagram in FIG. 11 to determine if measured QoS level 701 of the call is equal to L2 709.

The remainder of the flow diagram in FIG. 10 corresponds to the entries associated with L3 708 as shown in FIG. 7. Step 1002 corresponds to entry 712 of FIG. 7. Step 1003 corresponds to entry 713, step 1004 corresponds to entry 714, step 1005 corresponds to entry 715, and step 1006 corresponds to entry 716. If all the measurements contained in the collection of measurements satisfy the requirements of SLA 700, then evaluation processor 103 determines that measured QoS level 701 is equal to L3 708 in step 1007, and the process is exited in step 1008. Otherwise, the flow diagram in FIG. 11 is exited in step 905.

Figure 11:
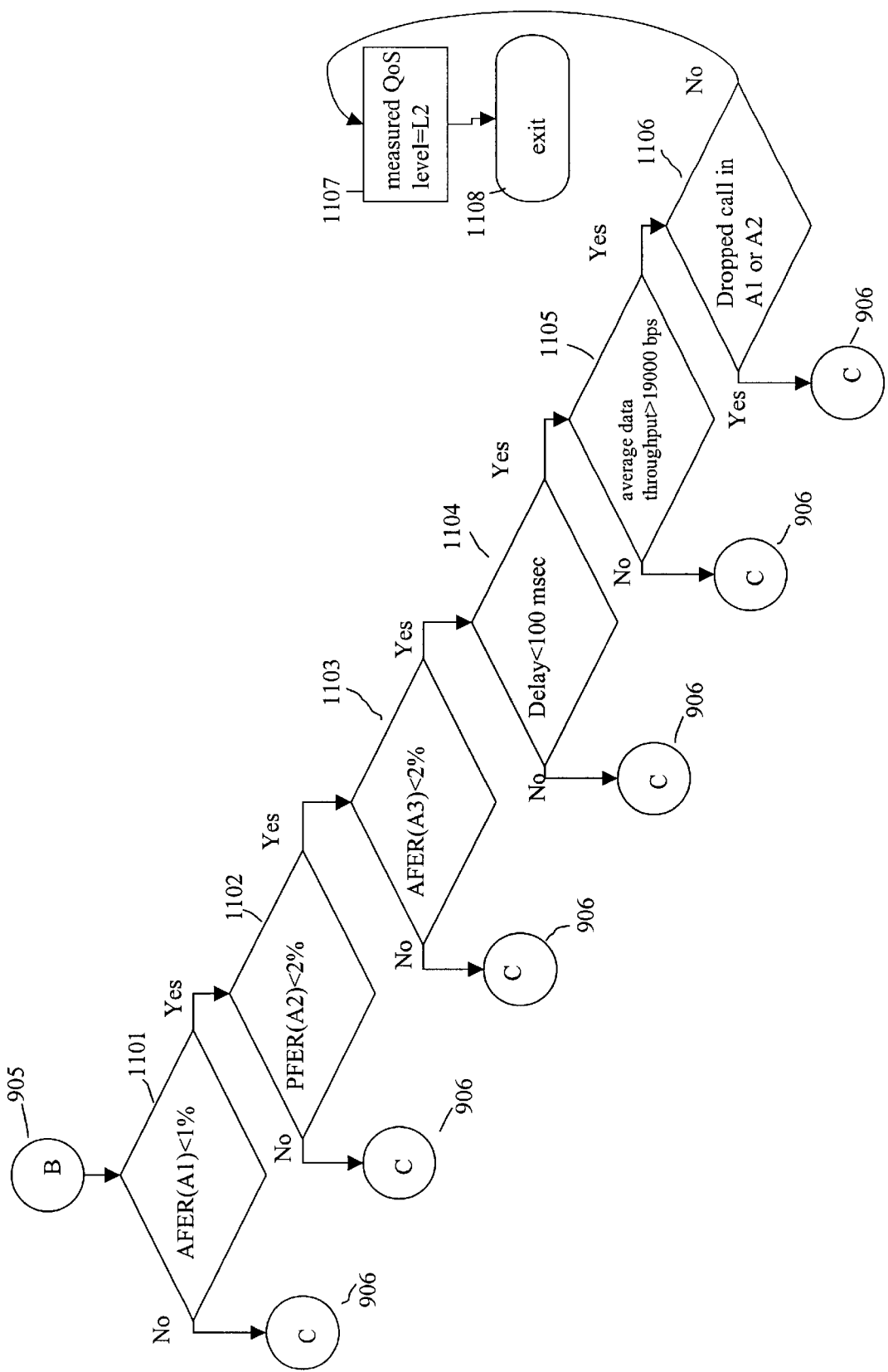
FIG. 11 is a flow diagram to determine whether a measured quality of service level of a call equal to a second defined quality of service level according to the service level agreement of FIG. 7.

FIG. 11 is a flow diagram that determines whether measured QoS level 701 is equal to L2 709. The flow diagram verifies that the measurements associated with the call satisfy the requirements specified in SLA 700 for L2 709 as shown in FIG. 7. The steps in the flow diagram correspond to the entries associated with L2 709. Step 1101 corresponds to entry 717, step 1102 corresponds to entry 718, step 1103 corresponds to entry 719, step 1104 corresponds to entry 720, step 1105 corresponds to entry 721, and step 1106 corresponds to entry 722. If all the measurements satisfy the requirements of SLA 700, then evaluation processor 103 determines that measured QoS level 701 equals L2 709 in step 1107, and the process is exited in step 1108. If any of the requirements for L2 709 are not satisfied, the flow diagram in FIG. 12 is exited in step 906.

Figure 12:
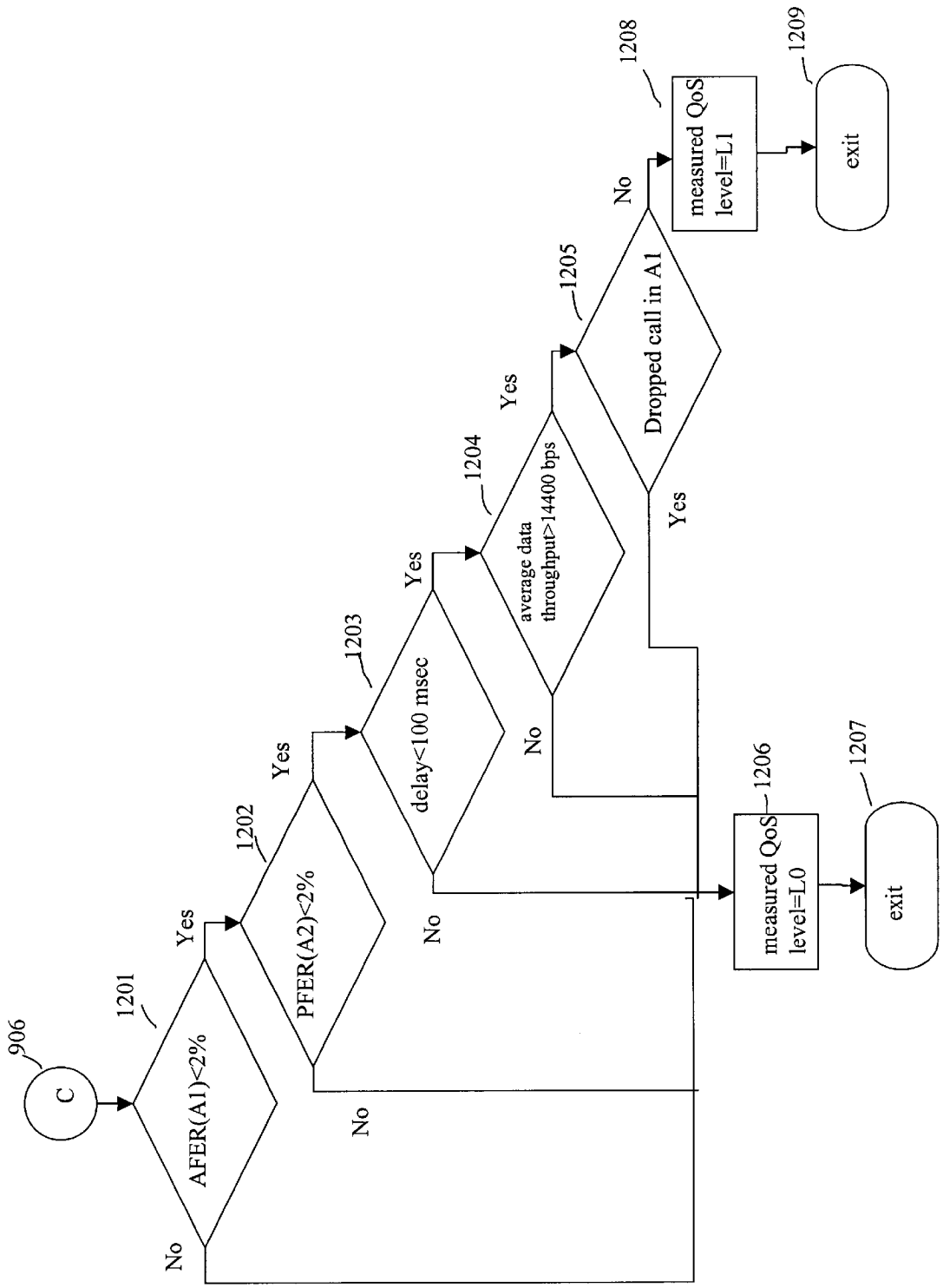
FIG. 12 is a flow diagram to determine whether a measured quality of service level equal of a call to a first defined quality of service level according to the service level agreement of FIG. 7.

FIG. 12 is a flow diagram that determines whether measured QoS level 701 is equal to L1 710. The flow diagram verifies that the measurements associated with the call satisfy the requirements specified in SLA 700 as shown in FIG. 7. The steps in the flow diagram in FIG. 12 correspond to the entries associated with L1 710 as shown in FIG. 7. Step 1201 corresponds to entry 723, step 1202 corresponds to entry 724, step 1203 corresponds to entry 726, step 1204 corresponds to entry 727, and step 1205 corresponds to entry 728. Entry 725 does not correspond to any step in FIG. 12 because entry 725 is equal to "NS" (not specified). AFER (A3) 704, which is the average framer error rate in area 603, is not specified in SLA 700 for L1 710. If all the requirements for L1 710, as contained in SLA 700 are satisfied, then measured QoS level 701 is determined to be equal to L1 710 in step 1208, and the process is exited in step 1209. Otherwise, measured QoS level 701 is determined to be equal to L0 730 in step 1206, and the process is exited in step 1207.

The flow diagrams as shown in FIG. 10, FIG. 11, and FIG. 12 represent the logic implied in SLA 700. In a first variation of the exemplary embodiment as described heretofore, the logic is implemented in software that is executed on evaluation processor 103. However, there are other variations to the exemplary embodiment as can be appreciated by one skilled in the art. A second variation of the exemplary embodiment can utilize data structure 1300 rather than processing the logic represented by FIG. 10, FIG. 11, and FIG. 12. Data structure 1300 comprises grading database 1301 and adjusting database 1351. Grading database 1301 comprises three entries: digital_L3 1302, digital_L2 1303, and digital_L1 1304. Digital_L3, 1302, digital_L2 1303, and digital_L1 1304 are digital transformations of L3 708, L2 709, and L1 710, respectively. The determination of digital_L3 1302, digital_L2 1303, and digital_L1 1304 are discussed in the context of FIG. 15, FIG. 16, and FIG. 17. Digital_L3 1302 represents the requirements for L3 708 as specified by entries 711, 712, 713, 714, 715, and 716 in FIG. 7. Similarly, digital_L2 1303 represents the requirements for L2 709 as specified by entries 717, 718, 719, 720, 721, and 722. Digital_L1 1304 represents the requirements for L1 710 as specified by entries 723, 724, 725, 726, 727, and 728. The calculation of 1302, 1303, and 1304 are discussed in FIG. 15, FIG. 16, and FIG. 17.

Figure 18:
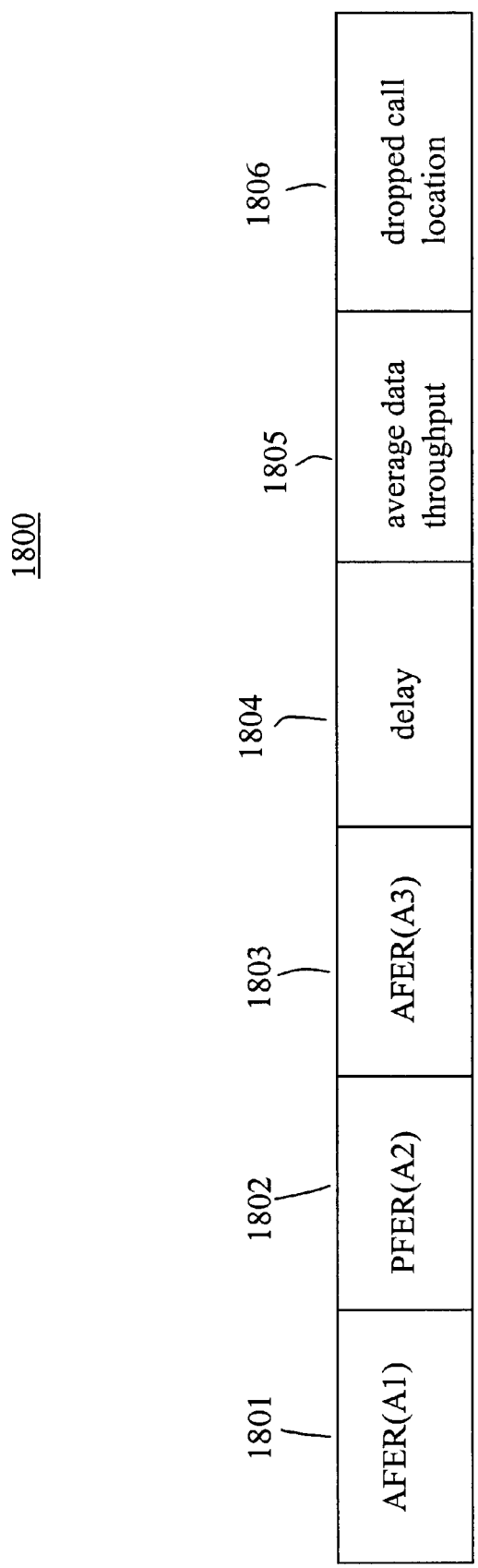
FIG. 18 shows the format of digital_measurement that is compared with the entries of the grading database of FIG. 13.

Measurements that are associated with the call and that are specified by SLA 700 are represented by digital_measurement 1800 (which is a digital transformation of the collection of measurements as shown in FIG. 18). Grading database 1301 is sequentially searched in which entries 1302, 1303, and 1304 are compared with digital_measurement 1800. The first match indicates measured QoS level 701 by the value of index 1310. As an example, if entry 1303 is the first match for digital_measurement 1800, index 1310 (which is equal to L2 709) indicates that measured QoS level 701 is equal to L2 709. If no matches are detected, measured QoS level 701 is determined to be equal to L0 730.

Figure 14:
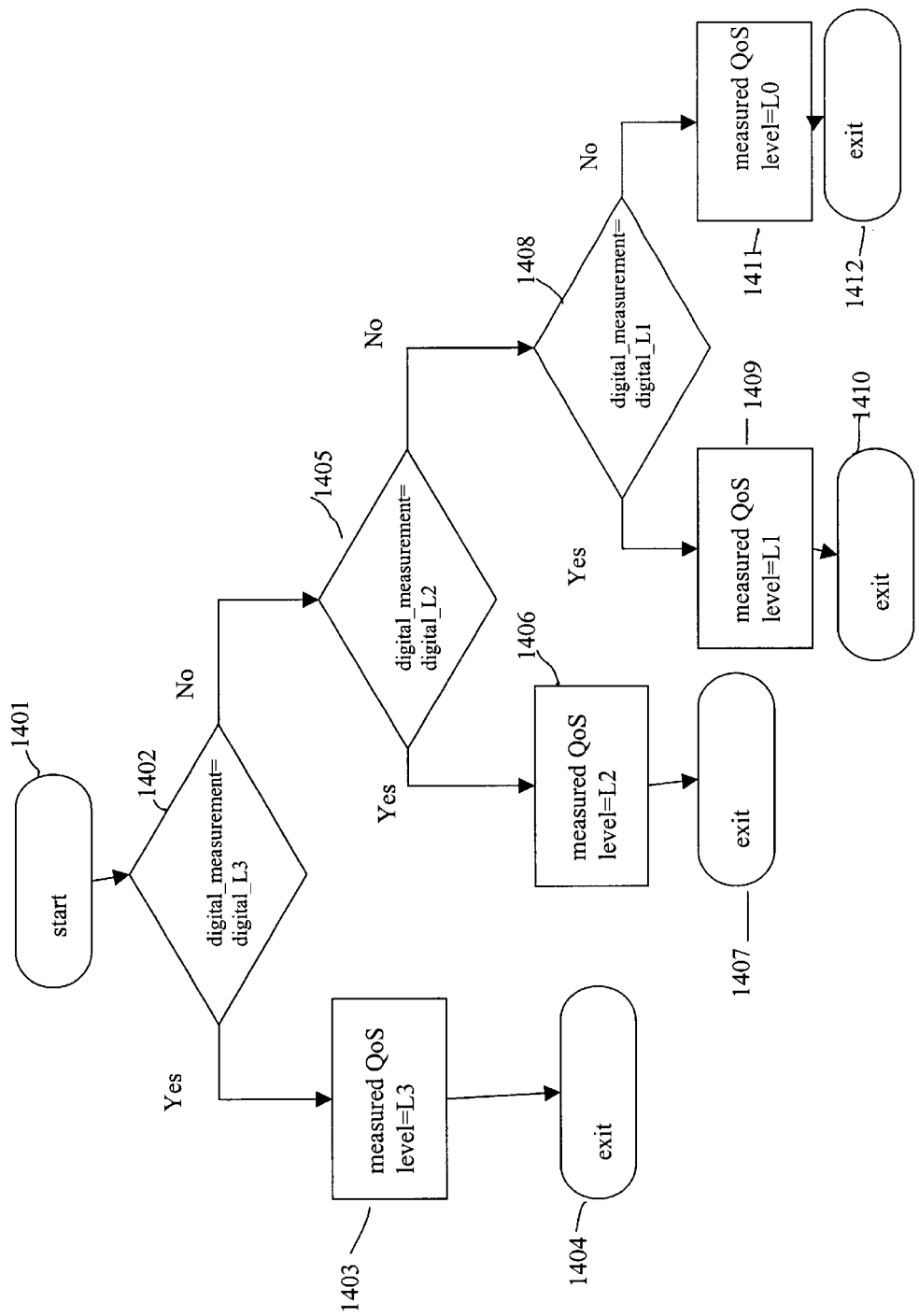
FIG. 14 is a flow diagram for searching the grading database of the data structure of FIG. 13.

The corresponding flow diagram for the process discussed heretofore is shown in FIG. 14. Step 1401 initiates the process that is executed by evaluation processor 103 by accessing grading database 1301. In step 1402, digital measurement 1800 is compared with digital_L3. If a match is detected, measured QoS level 701 is determined to be equal to L3 708 in step 1403. The process is exited in step 1404. Otherwise, digital_measurement 1800 is compared with digital_L2 in step 1405. If a match is detected, measured QoS level 701 is determined to be equal to L2 709 in step 1406, and the process is exited in step 1407. Otherwise digital_measurement 1800 is compared with digital_L1 in step 1408. If a match is detected, measured QoS level 701 is determined to be equal to L1 710 in step 1409, and the process is exited in step 1410. Otherwise, measured QoS level 701 is determined to be equal to L0 730 in step 1411, and the process is exited in step 1412.

Figure 13:
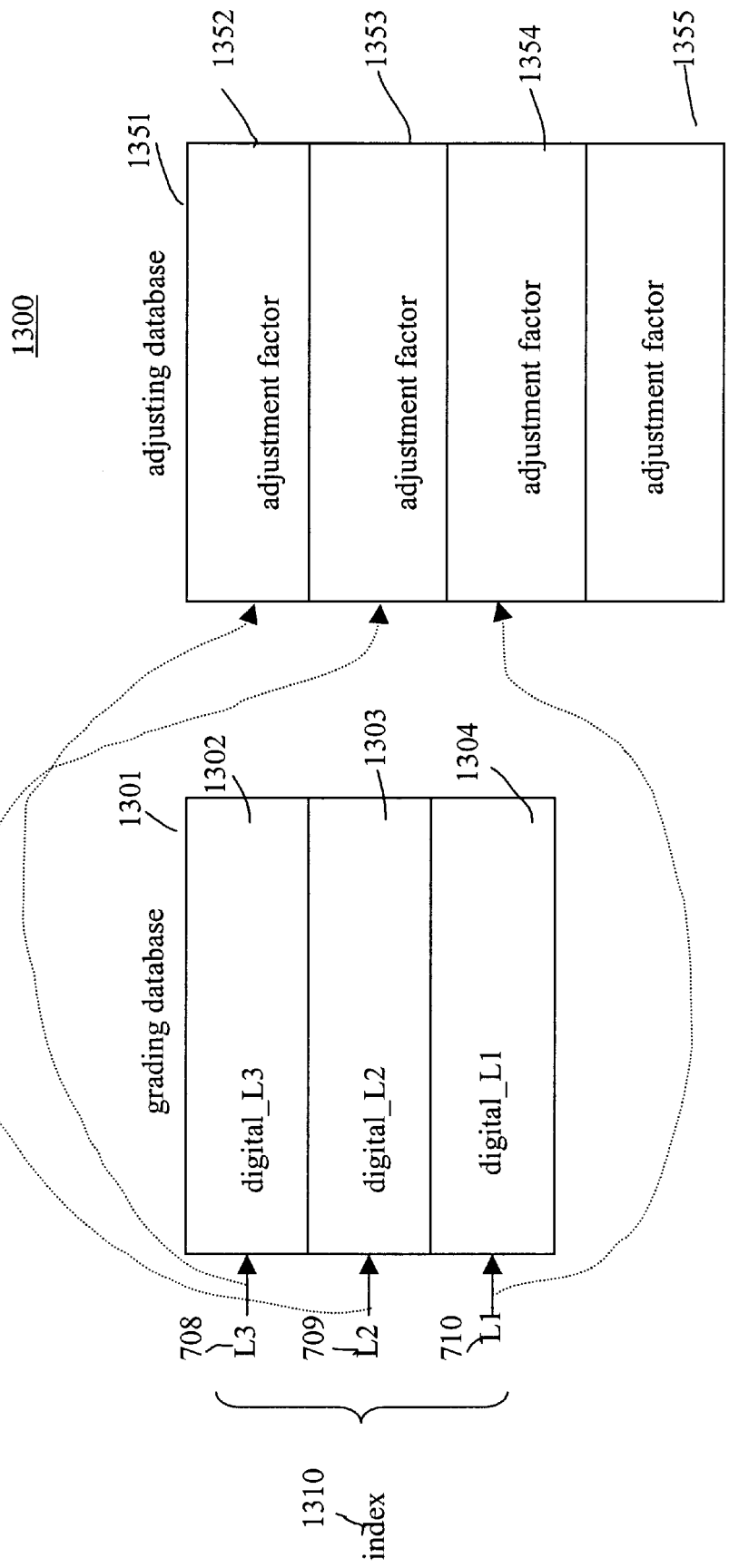
FIG. 13 illustrates a data structure in which an adjustment factor is determined according to the present invention.

Returning to the discussion of FIG. 13, the appropriate adjustment factor is determined by indexing adjusting database 1351 with measured QoS level 701 (as determined by grading database 1301). Adjusting database 1351 comprises four entries 1352, 1353, 1354, and 1355 corresponding to adjustment factors for L3 708, L2 709, L1 710, and L0 730, respectively. As an example, if the subscriber's class of service 800 equals class_2 803, entry 1352 equals 1.0, entry 1353 equals 1.0, entry 1354 equals 0.6, and entry 1355 equals 0. A comprehensive example utilizing databases 1301 and 1351 is presented with the discussion of FIG. 18.

FIG. 15 is a table of measurement ranges according to SLA 700 referenced in FIG. 7. Measurement ranges for each measurement that as specified in FIG. 7 are mapped to digital sequences. For example, with AFER (A1).lt. 1% (entry 1501), the corresponding digital sequence is equal to "00" (entry 1502). Entries 1501 and 1502 correspond to entries 711 and 717 in FIG. 7. Similarly, entries 1503 and 1504 correspond to entry 723. For AFER (A1) greater than 2%, entry 1505 maps to digital sequence "10" (entry 1506). The remaining entries of FIG. 15 map corresponding digital sequences to digital ranges specified in SLA 700.

FIG. 16 illustrates digital assignments for measurement ranges associated with defined QoS levels L3 708, L2 709, and L1 710 according to SLA 700. L3 708 is associated with digital sequence "00" (entry 1502) for AFER (A1) 702 corresponding to a value less than 1%, digital sequence "00" (entry 1508) for PFER (A2) 703 corresponding to a value less than 1%, digital sequence "0" (entry 1514) for AFER (A3) 704 corresponding to a value less than 2%, digital sequence "00" (entry 1518) for delay 705 corresponding go a value less than 80 msec, digital sequence "00" (entry 1524) for average data throughput 706 corresponding to a value greater than 28,800 bps, digital sequence "11" (entry 1602) for allowable dropped call area 707 corresponding to area A3 (603), and digital sequence "00" (entry 1602) corresponding to the case that the call did not drop.

L2 709 corresponds to "00", "01", "0", "01", "01", and "11" or "00" corresponding to AFER (A1) 702, PFER (A2) 703, AFER (A3) 704, delay 705, average data throughput 706, and allowable call location 707 in entries 1502, 1508, 1514, 1520, and 1603, respectively. Similarly L1 710 corresponds to entries 1504, 1510, 1601, 1520, 1528, and 1604. Entry 1601 (containing "0" and "1") indicates that all values of AFER (A3) 704 satisfy the requirements of SLA 700 because the specified value is "NS" in entry 725.

FIG. 17 shows the "digitization" of defined QoS levels 708, 709, and 710 using the information presented in FIG. 16. The digital sequences associated with defined QoS levels 708, 709, and 710 (as shown in FIG. 16) are concatenated and the resulting binary number is converted into a number with base 10. (The transformation is termed as the "digitization" of the defined QoS level.) As an example in FIG. 16, L2 709 corresponds to two concatenated binary numbers: "00 01 0 01 01 11" and "00 01 0 01 01 00". The equivalent base 10 numbers are "148" and "151", respectively. Both the numbers "148" and "151" are contained in entry 1703 and corresponds to entry 1303 of grading database 1301. Similarly the numbers "0" and "3" are contained in entry 1702 and corresponds to entry 1302. The numbers "664", "666", "667", "728", "730", and "731" are contained in entry 1704 and corresponds to entry 1304.

FIG. 18 shows the format of digital_measurement 1800 (which is the "digitization" of the collection of measurements associated with measured QoS level 701). In order to obtain the "digitization" of the collection of measurements, usage correlation processor 101 determines the measurement range (as shown in FIG. 15) of each measurement contained in the collection of measurements. (As an example, measurement AFER (A1)=0.5% satisfies two measurement ranges: AFER (A1).lt. 1% and AFER (A1).lt. 2%.) The digital sequences of the corresponding measurement ranges are then concatenated. In the second variation of the exemplary embodiment, usage correlation processor 101 collects measurements from network elements 115, 117, and 119 and converts the measurements into digital sequences according to the digital assignments shown in FIG. 15. The digital sequences are concatenated in the order: entries 1801, 1802, 1803, 1804, 1805, and 1806.

As an example, consider the following measurement that are collected from network elements 115, 117, and 119:
AFER (A1)=0.5%
PFER (A2)=1.1%
AFER (A3)=1.5%
delay=90 msec
average data throughput=20,100 bps
dropped call location="none"

Using the digital mapping of FIG. 15, the digital sequence for each of measurement is:
AFER (A1) corresponding to "00" (.lt. 1%) and "01" (.lt. 2%)
PFER (A2) corresponding to "01" (.lt. 2%)
AFER (A3) corresponding to "0" (.lt. 2%)
delay corresponding to "01" (.lt. 100 msec)
average data throughput corresponding to "01" (.gt. 19,000 bps) and "10" (.gt. 14,400 bps)
dropped call location corresponding to "00" (not a dropped call) Concatenating the digital sequences for all combinations, digital_measurement 1800 contains the numbers "148", "660", "152", and "664". Using the flow diagram in FIG. 14 for searching database 1301, one determines that measured QoS level 701 equals L2 709 because "148" matches one of the numbers contained in entry 1303 of database 1301. Using L2 709 as a pointer to adjusting database 1351, one determines that the corresponding adjustment factor is contained in 1353. (With class of service 800 equal to class_2 803, then entry 1353 contains a value of 1.0) Adjustment factor 1353 (corresponding to the example) with call detail information is sent to billing processor 121 for charging the call.

It is to be understood that the above-described embodiment is merely an illustrative principle of the invention and that many variations may be devised by those skilled in the art without departing from the scope of the invention. It is, therefore, intended that such variations be included with the scope of the claims.

What is claimed is:

1. A method for use in a telecommunications system for charging a call with a billing processor, said telecommunications system comprising at least one network element, said call involving a subscriber, said call comprising at least one call segment, said method comprising the steps of:

determining a collection of measurements associated with said call from said at least one network element by a usage correlation processor;

calculating a measured quality of service (QoS) level associated with said call from said collection of measurements by an evaluation processor;

comparing said measured QoS level with a defined QoS level specified in a service level agreement by said evaluation processor; and providing at least one adjustment factor to said billing processor by said evaluation processor in accordance with said measured QoS level and said service level agreement.

2. The method of claim 1, further comprising the step of:

rating said call by said billing processor in response to said step of providing said at least one adjustment factor.

3. The method of claim 1, wherein said step of calculating said measured QoS level of said call from said collection of measurements, further comprising the steps of:

comparing each measurement of said collection of measurements with a target objective associated with said defined QoS level by said evaluation processor, said target objective specified in said service level agreement; and equating said measured QoS level to said defined QoS level by said evaluation processor, wherein said each measurement is within said target objective.

4. The method of claim 3 further comprising the step of:

inputting said target objective that is associated with said defined QoS level through a SLA creation environment.

5. The method of claim 1, wherein said step of determining, said step of calculating, said step of comparing, and said step of providing said at least one adjustment factor are executed for each of said at least one call segment.

6. The method of claim 1, wherein said at least one adjustment factor is determined by a set of factors comprising a time of day, a class of service, and said measured QoS level.

7. The method of claim 1, further comprising the step of:

providing a call detail record and said collection of measurements of said call to an external processor in response to said step of determining said collection of measurements associated with said call.

8. The method of claim 1, wherein said telecommunications system is selected from a group consisting of a wireless communications system, a satellite-based communications system, and a terrestrial communications system.

9. The method of claim 1, wherein said call is selected from a group consisting of a voice call and a data call.

10. The method of claim 9, wherein said data call utilizes a voice over Internet Protocol (VoIP).

11. The method of claim 9, wherein said data call comprises a multimedia call.

12. An article of manufacturing comprising:

a computer usable medium having computer readable program code means embodied therein for determining a rate of a call associated with a subscriber, the computer readable program means in said article of manufacture comprising:

computer readable program code means for causing a computer to determine a collection of measurements associated with said call;

computer readable program code means for causing the computer to calculate a measured quality of service (QoS) level associated with said call from said collection of measurements;

computer readable program code means for causing the computer to compare said measured QoS level with a defined QoS level specified in a service level agreement; and computer readable program means for causing the computer to provide at least one adjustment factor to a billing processor in accordance with said measured QoS level and said service level agreement.

13. A memory for storing data for access by an application program being executed on a telecommunications system, said telecommunications system supporting a call associated with a subscriber, said memory comprising:

a data structure stored in said memory, said data structure comprising:

a grading database, said grading database containing a first data entry identified by a measured quality of service (QoS) level according to a service level agreement; and an adjusting database, said adjusting database containing a second data entry containing at least one adjustment factor of said call, said second data entry associated with said measured QoS level and a class of service assigned to said subscriber according to said service level agreement.

14. A telecommunications system, said telecommunications system charging a call by a billing processor, said telecommunications system comprising at least one network element, said call involving a subscriber, said call comprising at least one call segment, said telecommunications system comprising:

means for determining a collection of measurements associated with said call from said at least one network element by a usage correlation processor;

means for calculating a measured quality of service (QoS) level associated with said call from said collection of measurements by an evaluation processor;

means for comparing said measured QoS level with a defined QoS level specified in a service level agreement by said evaluation processor; and means for providing at least one adjustment factor to said billing processor by said evaluation processor in accordance with said measured QoS level and said service level agreement.

15. The telecommunications system of claim 14, further comprising:

means for rating said call by said billing processor in response to said means of providing said at least one adjustment factor.

16. The telecommunications system of claim 14, wherein said means for calculating said measured QoS level of said call further comprising:

means for comparing each measurement of said collection of measurements with a target objective associated with a defined QoS level by said evaluation processor; and means for equating said measured QoS level to said defined QoS level by said evaluation processor, wherein said each measurement is within said target objective.

17. The telecommunications system of claim 16, further comprising:

means for inputting said target objective associated with said defined QoS level through a SLA creation environment.

18. The telecommunications system of claim 14, wherein said means of determining, said means of calculating, said means of comparing, and said means of providing said at least one adjustment factor are executed for each of said at least one call segment.

19. The telecommunications system of claim 14, further comprising:

means for providing a call detail record and said collection of measurements associated with said call to an external processor in response to said means of determining said collection of measurements.

* * * * *